(12) United States Patent
Herbert et al.

(10) Patent No.: US 6,755,204 B2
(45) Date of Patent: Jun. 29, 2004

(54) MULTI-WAY VALVE EMPLOYING TWO-STATE OPERATOR

(75) Inventors: Kay Herbert, Winthrop, MA (US); Natan E. Parsons, Brookline, MA (US); Fatih Guler, Winchester, MA (US)

(73) Assignee: Arichell Technologies, Inc., West Newton, MA (US)

( * ) Notice: Subject to any disclaimer, the term of this patent is extended or adjusted under 35 U.S.C. 154(b) by 240 days.

(21) Appl. No.: 10/090,447

(22) Filed: Mar. 4, 2002

(65) Prior Publication Data

US 2003/0164192 A1 Sep. 4, 2003

(51) Int. Cl.[7] ................................................ F17D 3/00
(52) U.S. Cl. ................. 137/1; 137/624.18; 137/119.03; 137/119.1
(58) Field of Search ........................ 137/624.18, 624.19, 137/119.08, 119.1, 119.03

(56) References Cited

U.S. PATENT DOCUMENTS

| | | | |
|---|---|---|---|
| 3,920,337 A | 11/1975 | Ganz | |
| 3,955,893 A | 5/1976 | Pulaski | |
| 4,057,073 A | 11/1977 | Adams | |
| 4,488,476 A | 12/1984 | Diel et al. | |
| 4,744,285 A | 5/1988 | Presley | |
| 4,790,678 A | 12/1988 | Araki | |
| 4,880,032 A | 11/1989 | Doutt | |
| 4,921,002 A | * 5/1990 | Christon et al. | 137/119.03 |
| 4,973,179 A | 11/1990 | Nakazato et al. | |
| 5,074,694 A | 12/1991 | Nakazato et al. | |
| 5,152,626 A | 10/1992 | Eppler | |
| 5,454,655 A | 10/1995 | Chiswell | |
| 5,599,003 A | 2/1997 | Seemann et al. | |
| 5,727,591 A | 3/1998 | Doll | |
| 5,819,789 A | 10/1998 | Schneider | |
| 5,871,296 A | 2/1999 | Furukawa et al. | |
| 6,206,028 B1 | 3/2001 | Holden et al. | |
| 6,260,468 B1 | 7/2001 | Ryken et al. | |

* cited by examiner

Primary Examiner—Kevin Lee
(74) Attorney, Agent, or Firm—Foley Hoag LLP

(57) ABSTRACT

A land (56) on an index member (32) disposed in the interior chamber of a manifold (38) is aligned with an actuating member (34) and thereby holds open a check valve (36) through which fluid flows into the manifold's interior chamber, through a control valve (12), and out a manifold outlet (74). At the same time, another actuating pin (42) is so aligned with a recess (58) in the indexing member (32) as to permit another check valve (44) to prevent flow through itself into the manifold chamber. When the control valve is closed, flow stops, and pressure builds up in the manifold chamber. The index member (32) is accordingly driven against the force of a bias spring (48) to a lower position, in which a lower cam-follower surface (82) engages a lower cam surface (84). That engagement rotates the index member to a position in which it permits pressure to be communicated through both check valves (36 and 44) into the manifold chamber. When the control valve (12) reopens and thereby again relieves the pressure within the manifold chamber, the return of the index member (32) to the upper position causes an upper cam-follower surface (52) to engage cam pins (54). Those pins thereby cam the index member (32) to a new position, in which it opens the left check valve (44) and allows the right check valve (36) to close. By thus alternately operating the control valve (12) between its two, open and closed positions, the system is advanced through a sequence of three different flow states.

38 Claims, 13 Drawing Sheets

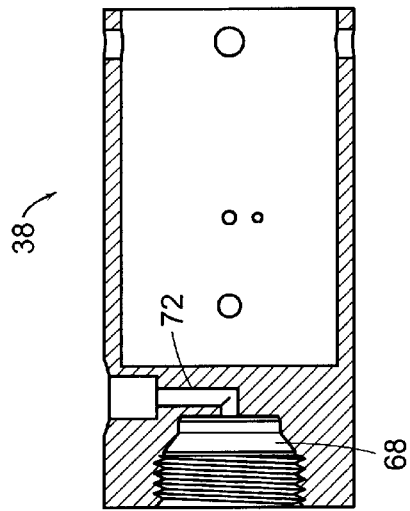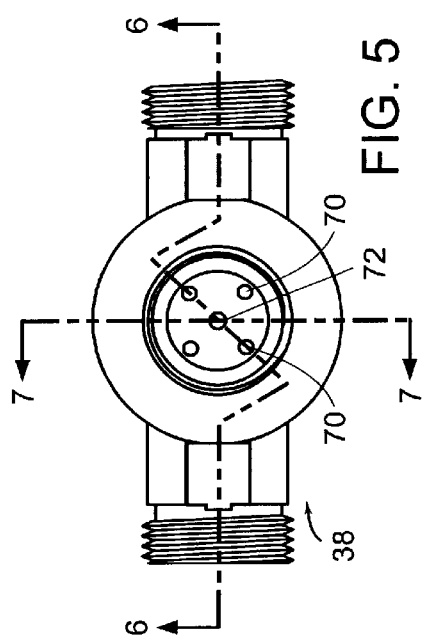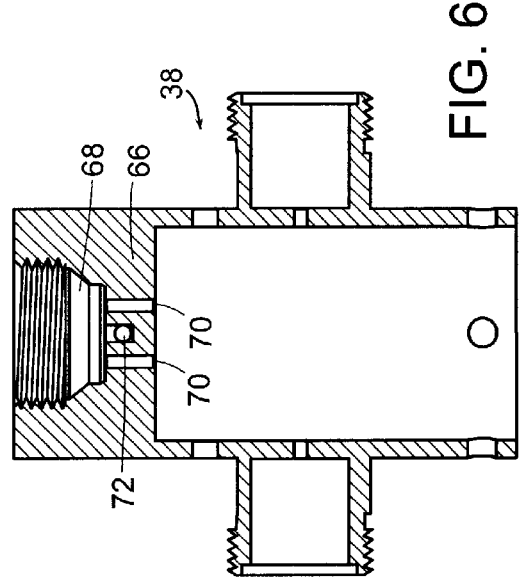

MULTI-WAY VALVE EMPLOYING TWO-STATE OPERATOR

BACKGROUND OF THE INVENTION

1. Field of the Invention

The present invention concerns flow control. It has particular, although not exclusive, application to automatic selection among multiple flow states.

2. Background Information

Fluid flow has been controlled automatically in a wide range of applications for over a century, and electrically operated valves have been employed in most cases. Yet there are a number of applications in which conversion of flow control from previously manual operation to automatic operation has become popular only in recent years. Examples are object-sensor-controlled faucets and flushers employed in public restrooms. Because of advances in control-logic circuitry and in valve-operator efficiency, it has become practical to extend automatic flow control to such applications, where cost considerations would previously have ruled out their use.

While such market penetration is a testament to advances in these technologies, cost and power considerations still remain limiting factors in some contexts. In some cases, for example, the flow-control systems must be powered by batteries and achieve battery life on the order of several years. Clearly, energy constraints are severe in such applications. And, while significant further reductions in the cost of logic circuitry can be expected, the energy requirements and capital cost of (typically solenoid-actuated) electrical valves are likely to fall much more slowly. So the valve actuator will be a significant contributor not only to a flow-control system's initial cost but also to its power consumption, and it can thus determine whether automatic operation is practical in a given application.

In the case of multi-way flow systems, one approach to containing that element of system cost is exemplified by the arrangement that U.S. Pat. No. 5,727,591 to Doll illustrates. In that arrangement, a simple two-state actuator operates a reciprocation-stepper mechanism. Such a mechanism, of which perhaps the most familiar example is the advance/retract mechanism in retractable ball-point pens, is operated by advancing and retracting its reciprocation member, e.g., a pen's operator button. Repeated reciprocation of that member causes an indexing member (which may be the same as the reciprocation member) to advance through a sequence of index positions. In the case of the ball-point pen, advancing through the sequence yields only two different pen states, one in which the pen is extended and the other in which it is retracted. In the Doll arrangement, though, the index member is advanced through states in which it offers three different levels of resistance to fluid flow.

While the Doll arrangement does provide a way of using a simple two-state actuator to select among a greater number of flow states, it turns out that the resultant savings are largely illusory. Although that arrangement uses only a single such actuator, the size and power that its solenoid requires tend to be high if significant flow rates or high pressures are to be controlled.

SUMMARY OF THE INVENTION

We have developed a way of reducing the portion of system cost that the electrical valve actuator tends to contribute when the system needs to choose among more than two flow states. According to our invention, a manifold forms a manifold chamber and a plurality of ports that afford access to the manifold chamber. The reciprocation stepper's reciprocation member is so exposed to the manifold chamber's pressure that it tends to be urged thereby to an extended reciprocation state when the manifold-chamber pressure is elevated. The pressure of the fluid being controlled can therefore be enlisted to operate the reciprocation member, and power needs to be expended only to control the admission of pressurized fluid into chamber. That is, one of the ports is a control port, and a valve used to control flow through the control port can thereby control the reciprocation member's reciprocation state.

Now, the pressure of the controlled fluid has been used for this purpose before; U.S. Pat. Nos. 4,448,476 to Diel et al. and 4,744,285 to Presley describe examples. But we have recognized that the advantage of using the fluid's pressure to operate the reciprocation member can be obtained without the complicated arrangements to which those approaches resort. Although those approaches do advance and retract the reciprocation member by alternately pressurizing and relieving pressure in the ported manifold chamber, they need multi-way valves to redirect the pressurized fluid alternately to opposite sides of the reciprocation member. We instead bias the reciprocation member to a relaxed reciprocation state so that a simple two-state valve can control the reciprocation state; pressure does not have to be controlled on both sides of the reciprocation member.

The two-state control valve may, for example, alternately maintain and relieve pressure communicated into the manifold chamber by one or more other, controlled ports. The reciprocation member's bias will cause it to assume a relaxed state when the control valve is open and thereby relieves the chamber pressure, and the high chamber pressure that results when the control valve is closed will cause that member to assume an extended state. As will be explained below, this toggling between states causes the index member to advance through positions in which it causes different flow states among the manifold ports. Use of a two-state control valve for this purpose affords the potential for very low capital cost and energy use.

BRIEF DESCRIPTION OF THE DRAWINGS

The invention description below refers to the accompanying drawings, of which:

FIG. 5 is a plan view of the pilot valve's manifold;

FIG. 6 is a cross-sectional view of the manifold taken at line 6—6 of FIG. 5;

FIG. 7 is a cross-sectional view of the manifold taken at line 7—7 of FIG. 5;

DETAILED DESCRIPTION OF AN ILLUSTRATIVE EMBODIMENT

Figure 1:
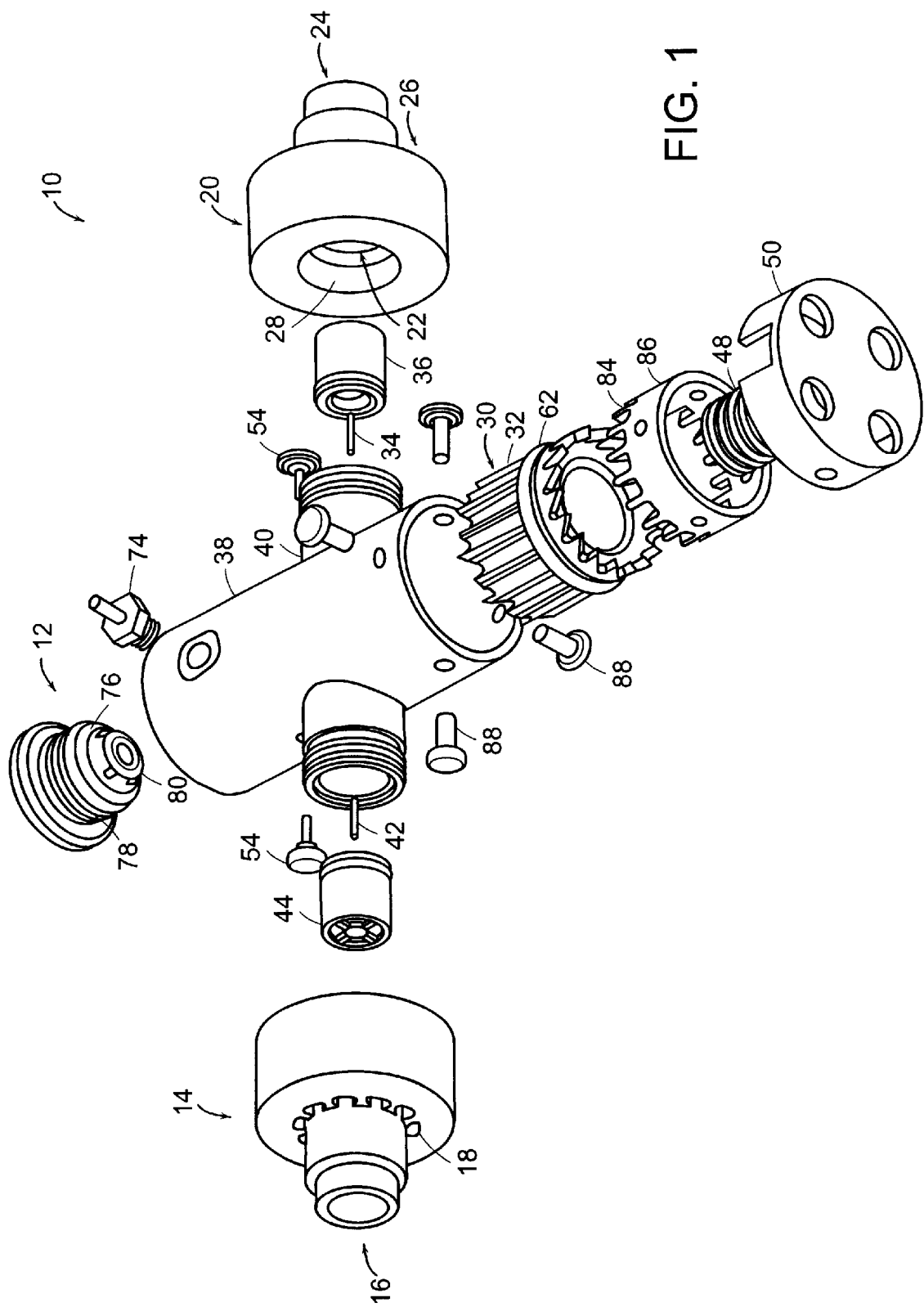
FIG. 1 is an exploded view of an embodiment of the present invention used as a three-way pilot valve to control flow in two main valves.

To give one example of an application to which the present invention can be applied, FIG. 1 illustrates a flow-control system 10 in which an embodiment of the invention serves as a three-way pilot valve, although the present invention is not restricted to pilot-valve use or to only three flow states. A constituent of the three-way valve is a simple open/close electrically operated valve 12 (of which FIG. 1 depicts only the port assembly). As will be explained below, the three-way valve is sequenced among its three different flow states by toggling its constituent control valve 12 between its open and closed states. In one of these flow states, the three-way valve allows a first main valve 14 to permit flow from its inlet 16 to its outlet openings 18 but prevents similar flow through another main valve 20. In a second state, it allows flow through valve 20 but not valve 14. In the third state, valves 14 and 20 both prevent flow.

The three-way valve may be used, for example, in a flow-control system that is to select among no fluid flow, low fluid flow, and high fluid flow through a faucet. The two main valves would receive, say, water from the same source and feed the same faucet, but the paths that the valves control would offer different levels of flow resistance, so opening different valves results in different flow rates. It will become apparent that a minor modification of the illustrated embodiment would yield a further flow state, one in which flow through both valves is permitted. Indeed, those skilled in the art will recognize that reciprocation-stepper mechanisms can be used to provide any number of different states. For the sake of simplicity, though, the examples will be confined to three-way valves.

When valve 20 is in its closed position, a flexible diaphragm 22 is seated on a valve seat (not shown) and thereby prevents flow from its inlet 24 to its outlets 26. The diaphragm remains seated despite the inlet pressure because the diaphragm 22 has a bleed orifice (not shown) that permits the pressure at the inlet 24 to build up within a pilot chamber 28 on the diaphragm's other side. On that side, the pressure prevails over a greater diaphragm area than it does on the inlet side, so it forces the flexible diaphragm to remain seated: it keeps valve 20 closed.

As will be explained in more detail below, valve 20 is opened from this state when the fluted surface 30 of an index member 32 is brought into a position in which it causes an operating pin 34 to unseat a check valve 36. Unseating check valve 36 relieves valve 20's pilot-chamber pressure into the interior of a manifold 38 through an inlet port 40. Index-member surface 30 will at the same time be so positioned as to permit another operating pin 42 to remain in a retracted position, where it permits a further check valve 44 to remain seated. That check valve thereby prevents relief of valve 14's pilot-chamber pressure, so valve 14 remains closed.

As will also be explained below, repeatedly opening and closing control valve 12 causes the index member 32 to advance through successive index positions, in some of which it instead closes both valves or opens valve 14 and closes valve 20. As will be seen presently, this results because member 32 is the index member of a reciprocation stepper. In the illustrated embodiment, moreover, it is also the reciprocation member, although the present invention's teachings can be implemented without employing the same member for both functions.

Figure 2:
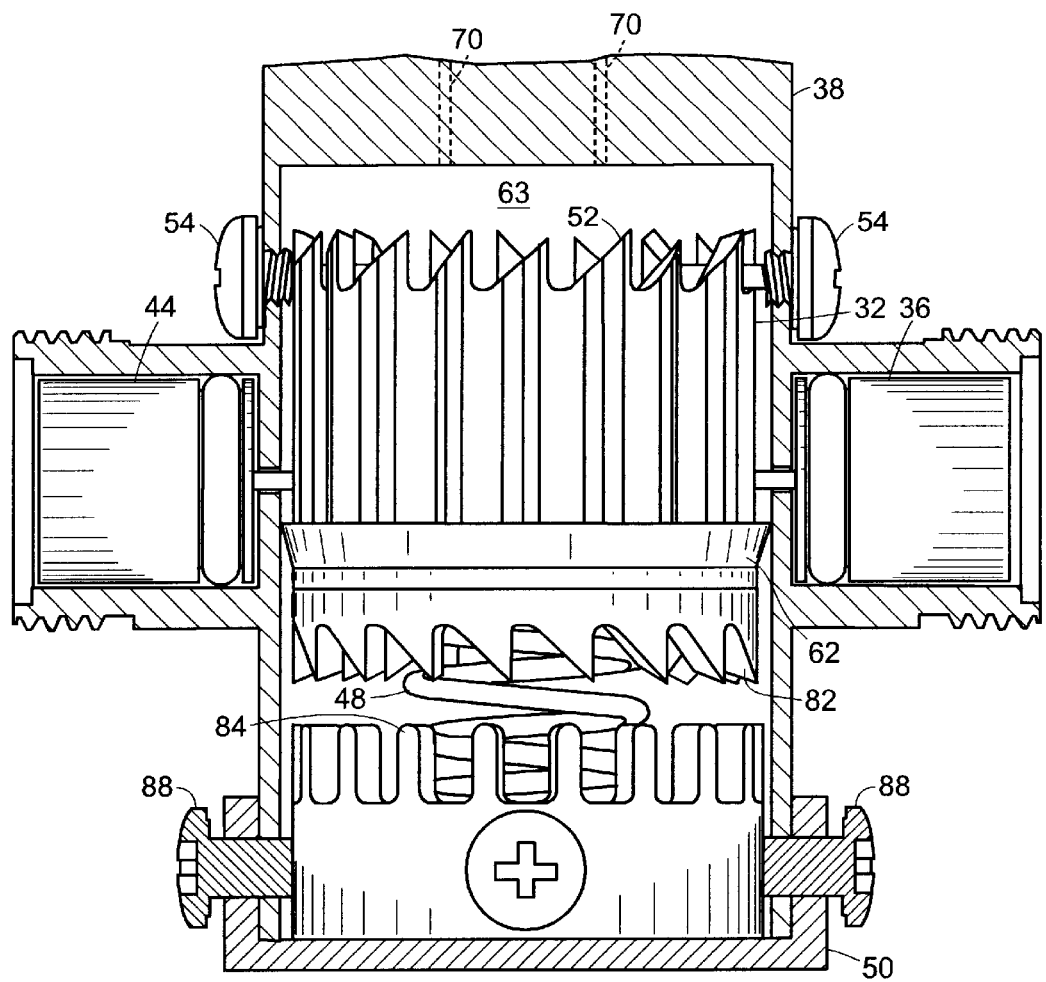
FIG. 2 is a front elevational view, partly broken away, of that multi-flow-state pilot valve with its index member in its relaxed reciprocation position.
Figure 3:
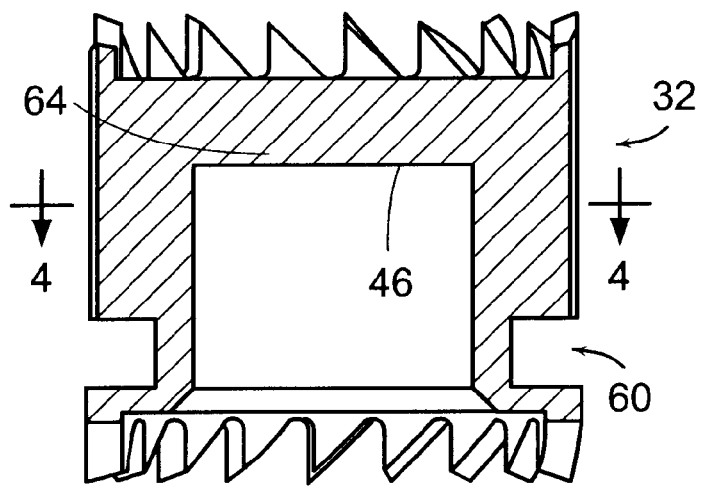
FIG. 3 is a vertical section through that pilot valve's index member.

FIG. 2 is a partially broken away elevational view of the manifold 38 into which the index member 32 has been assembled. As FIG. 3 illustrates, index member 32 forms an interior stop surface 46. In the state that FIG. 2 depicts, a bias spring 48 compressed by an end cap 50 has urged the index member 32 into an upward position, in which a generally sawtooth-shaped cam-follower surface 52 bears against cam pins 54 secured in holes that the manifold 38 forms.

Figure 4:
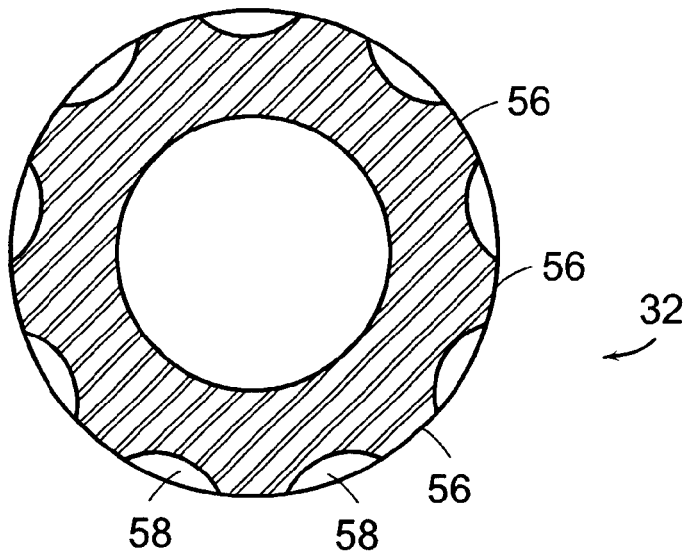
FIG. 4 is a cross section taken at line 4—4 of FIG. 3.

FIG. 4 shows that the index member 32 forms a plurality of longitudinally extending lands 56. As will presently be explained in more detail, one of FIG. 1's actuating pins 34 and 42 is aligned with one of those lands, while other is not. The operating pin aligned with a land opens its corresponding check valve 36 or 44 and thereby admits fluid into the space that the longitudinal inter-land recess 58 (FIG. 4) forms between the index member 32 and the manifold 38's interior wall.

As FIG. 3 shows, the index member 32 forms an annular groove 60. As FIGS. 1 and 2 show, that groove receives a lip seal 62. Seal 62 prevents flow downward in FIG. 2, but it does not prevent upward flow. If the manifold chamber 63 that the manifold 38's interior wall cooperates with the seal and FIG. 3's top index-member wall 64 to form were completely closed, the pressure from the open port would simply be communicated to that chamber and thus not relieve the pressure in valve 14's pilot chamber. In the state that FIG. 2 is intended to represent, though, the manifold chamber is not closed, because a pressure-relief path prevents any elevated pressure from prevailing in the manifold chamber. Specifically, FIGS. 5, 6, and 7 show that the manifold 38's upper wall 66 forms a control chamber 68 into which four inlet ports 70 lead and from which an outlet port 72 leads to the manifold exterior through FIG. 1's drain fitting 74.

Now, the control-valve assembly 12 of FIG. 1 forms the control chamber 68's upper wall. Its outer O-ring 76 prevents leakage through the screw threads 78 by which the control-valve assembly 12 is secured to the manifold 38. And an inner O-ring 80 is so disposed as to prevent flow from the inlet ports 70 of FIG. 6's control chamber 68 to its outlet port 72 except through the control valve 12 itself. But that valve is open in the state that FIG. 2 is intended to represent, and the flow resistance through that valve is low enough when it is open to keep the manifold pressure too low to overcome the force that FIG. 2's spring 48 exerts. So long as that valve is open, therefore, the index member 32 remains in the relaxed reciprocation state that FIG. 2 depicts. Preferably, the control valve 12 is of the latching type, which requires power only to change state, not to remain in either state. So keeping valve 12 open requires no power.

Figure 8:
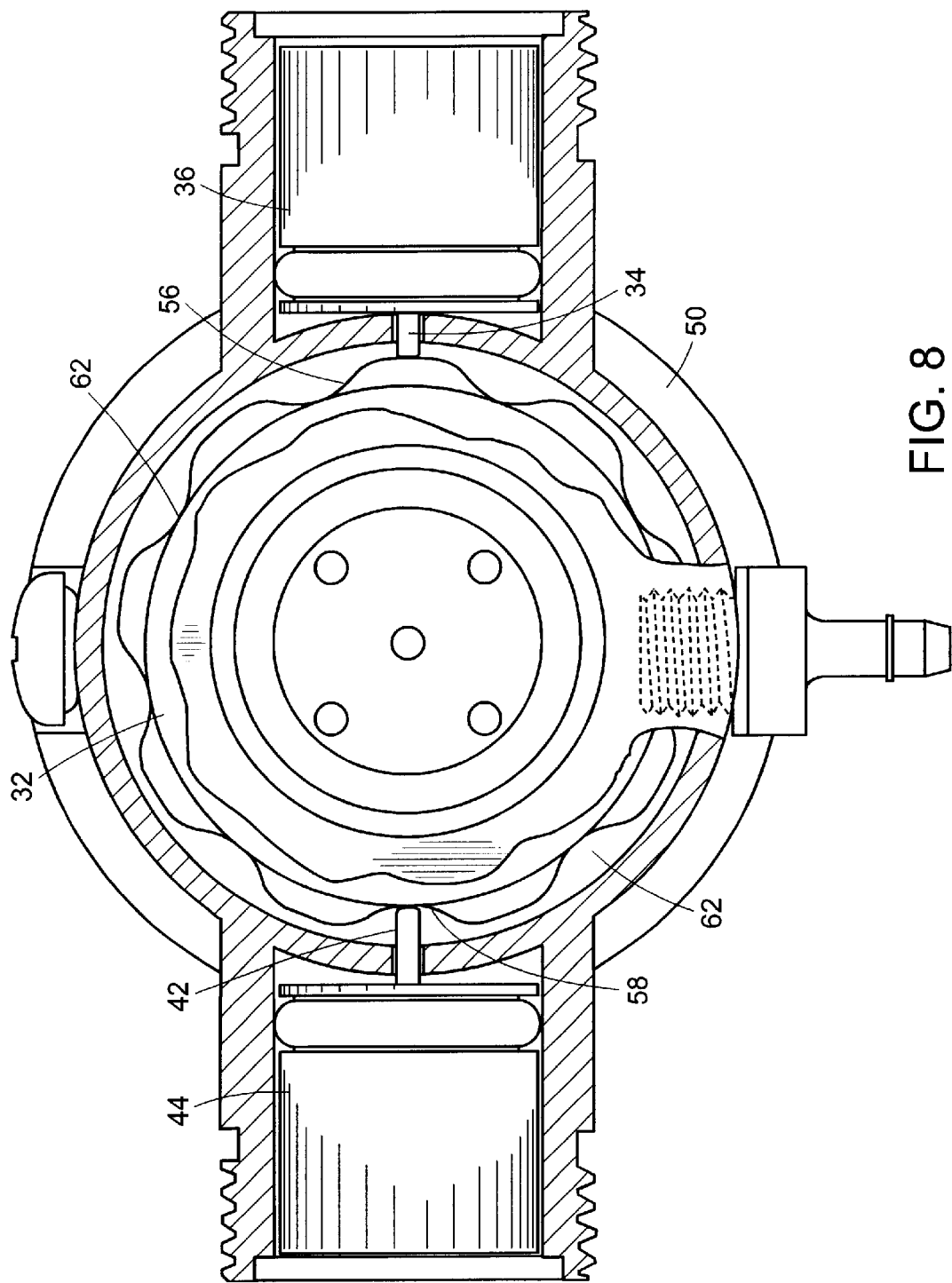
FIG. 8 is a plan view of the pilot valve, with its control valve removed and manifold shown in section, depicting the flow state in which the pilot valve permits flow from its right inlet port through its outlet port.

If the index member 32 is not only in the reciprocation state that FIG. 2 depicts but also in the index position shown in FIG. 8, one of the lands 56 is aligned with the right port's actuator pin 34. The land thereby holds the pin in a position in which it keeps check valve 36 unseated, so fluid can flow through the right port into the manifold chamber. At the same time, the other actuator pin 42 is aligned with a recess 58, so check valve 44 remains seated and does not permit flow into the manifold chamber through the left port.

The index member 32's index position thus determines the states of the left and right ports, the control valve 12 determines the state of the top port, and the control valve 12 cooperates with the index member 32 to determine the three-way valve's overall flow state. FIG. 8 is intended to represent the flow state in which fluid can flow to the top port from the right port but not from the left port. And, in the application illustrated in FIG. 1, where the three-way valve serves as a pilot valve, the three-way valve keeps main valve 14 open and main valve 20 closed in this flow state. As will be seen, this is one of three flow states that the illustrated embodiment can assume. In this flow state, fluid can flow from the three-way valve's right port to its outlet.

Figure 9:
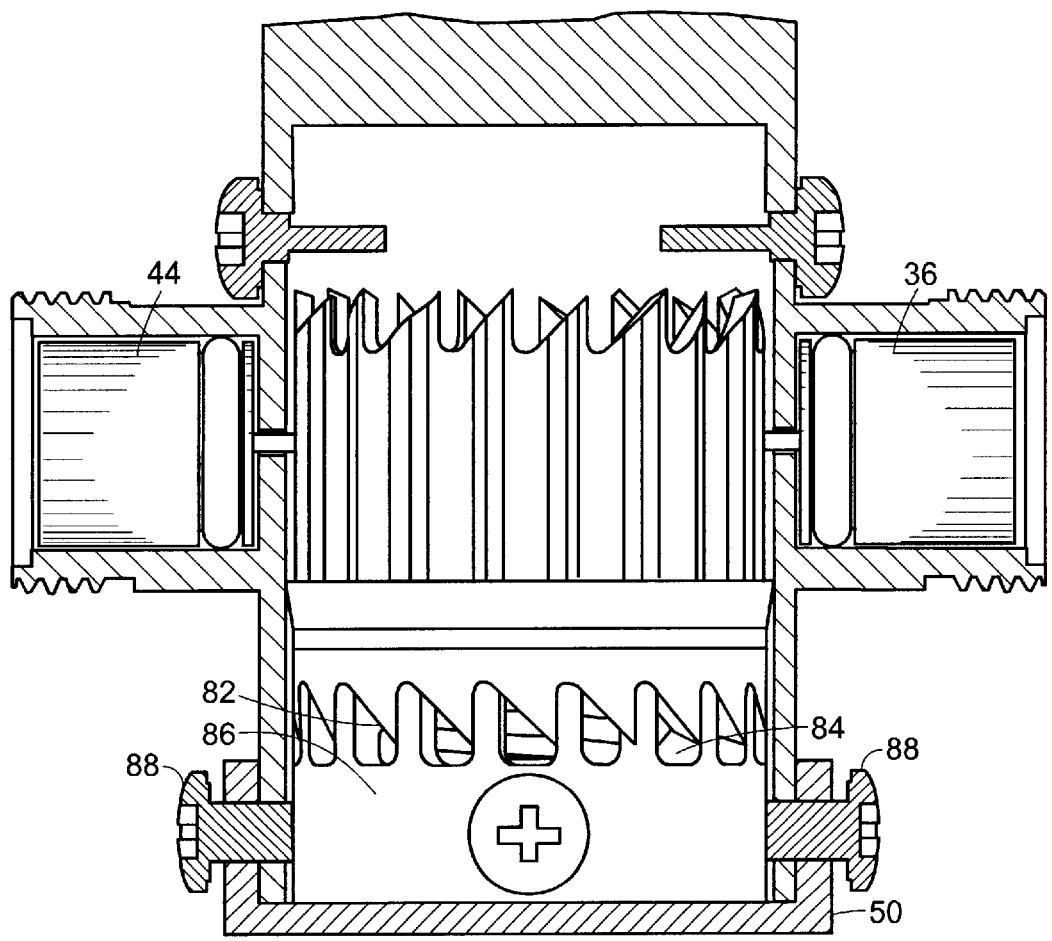
FIG. 9 is a view similar to FIG. 2 but with the index member in its extended reciprocation position.
Figure 10:
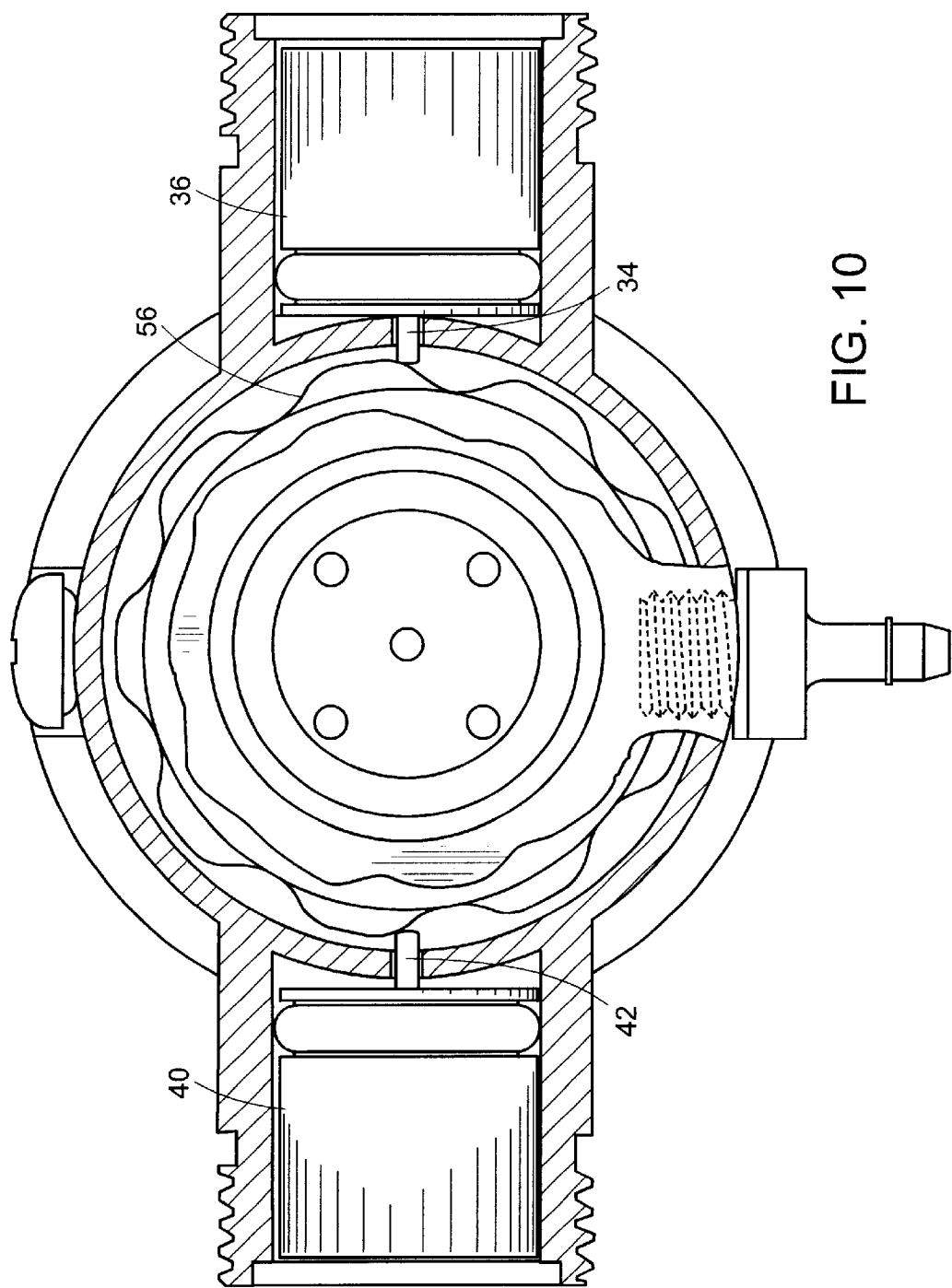
FIG. 10 is a view similar to FIG. 8 but depicting a flow state that the pilot valve can assume when the index member is in the reciprocation state that FIG. 9 depicts.

Now let us assume that a control circuit to be described below so operates the control valve 12 as to close it and thereby prevent flow out of the manifold chamber. Since flow has thus stopped, the pressure drop resulting from flow resistance in the path through the right port into the manifold chamber is eliminated. The manifold pressure therefore becomes high enough to force the index member 32 down into the position that FIG. 9 depicts. As it translates axially to assume that position, the index member 32's generally sawtooth-shaped lower cam-follower surface 82 encounters the cam surface 84 of a lower cam member 86, which is secured to the manifold 38 by the screws 88 that hold the end cap 50 in place. This causes the index member 32 to rotate to an index position, illustrated in FIG. 10, in which neither of the actuator pins 34 and 42 is completely aligned with a land 56.

Both check valves 36 and 40 therefore allow inlet-fluid pressure to be communicated into the manifold chamber, from which now-closed control valve 12 prevents pressure relief. Control valve 12's closure has thus switched the three-way valve from the first flow state, in which it permitted flow from the right port into the manifold chamber and out the top port, to a second flow state, in which no flow occurs. In the illustrated application, in which the three-way valve serves as a pilot valve, the main valves 14 and 20 that it controls are therefore closed.

We digress at this point to note our assumption that "cross talk" between the two controlled ports is not a significant concern. Other applications may require that cross talk be prevented, though. This can be done by placing further, oppositely oriented check valves in series with the illustrated check valves.

Figure 11:
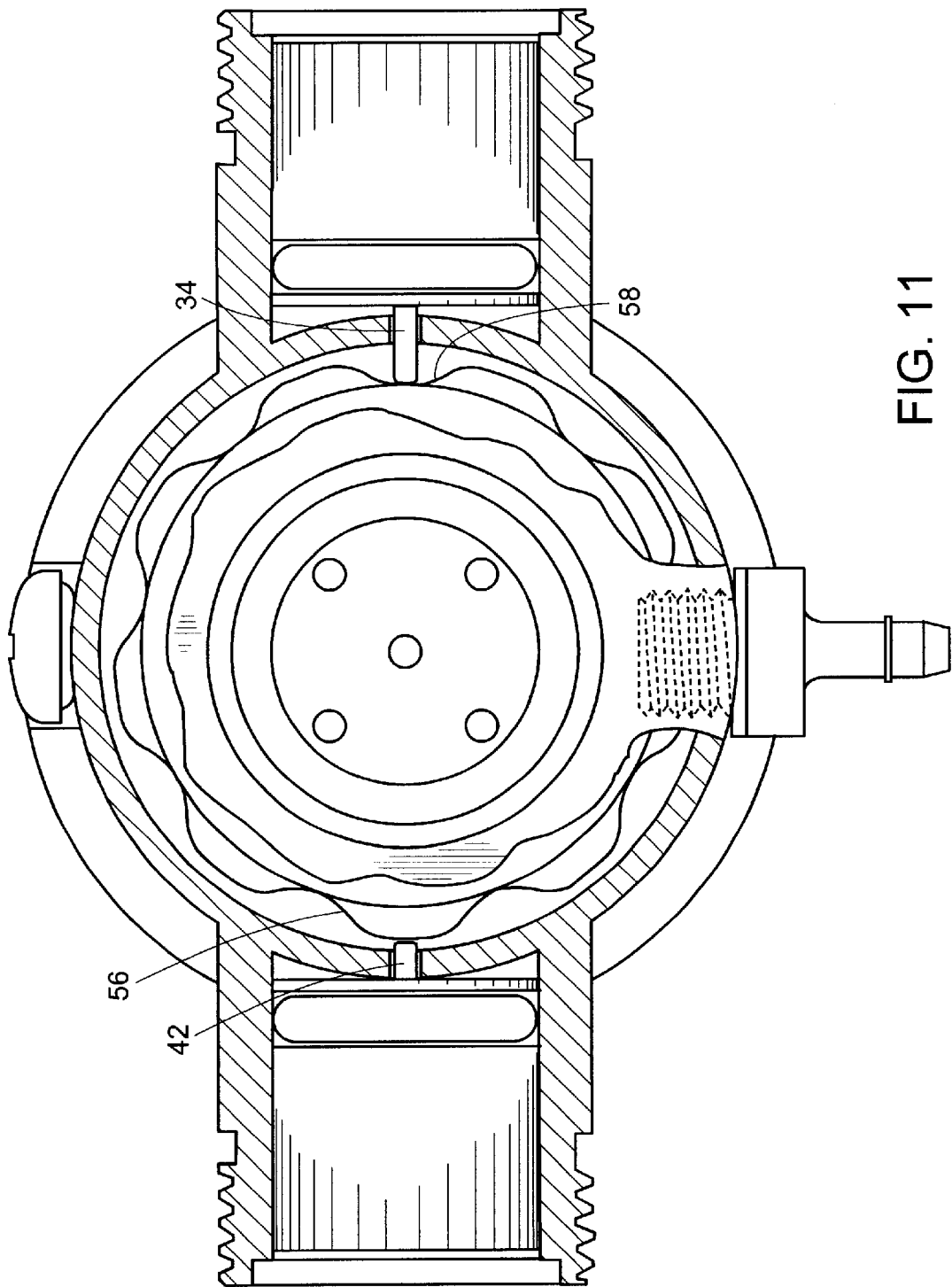
FIG. 11 is a view similar to FIG. 8 but showing the flow state in which the pilot valve permits flow to its outlet from its left inlet rather than from its right inlet.

Now assume that the control valve 12 is actuated to return it to its open position, in which it again relieves the manifold pressure. The bias spring 48 returns the index member 32 to the relaxed reciprocation state, which FIG. 2 depicts, but not to the index position it was in the last time it assumed the relaxed reciprocation state. In returning to that state, the index member's upper cam-follower surface 52 encounters cam pins 54, and the index member 32 is rotated to another of its index positions, one that FIG. 11 depicts. That index position results in a different, third flow state. Specifically, it is now actuator pin 42 that is aligned with a land 56, while actuator pin 34 is aligned with a recess 58. So check valve 32 is closed, check valve 44 is open, and flow out through the manifold outlet 74 is now permitted from the left port rather than, as it was the last time the index member was in its relaxed reciprocation state, from the right port.

In summary, repeated operation of control valve 12 between its two states has advanced the three-way valve system through three different flow states.

Figure 12:
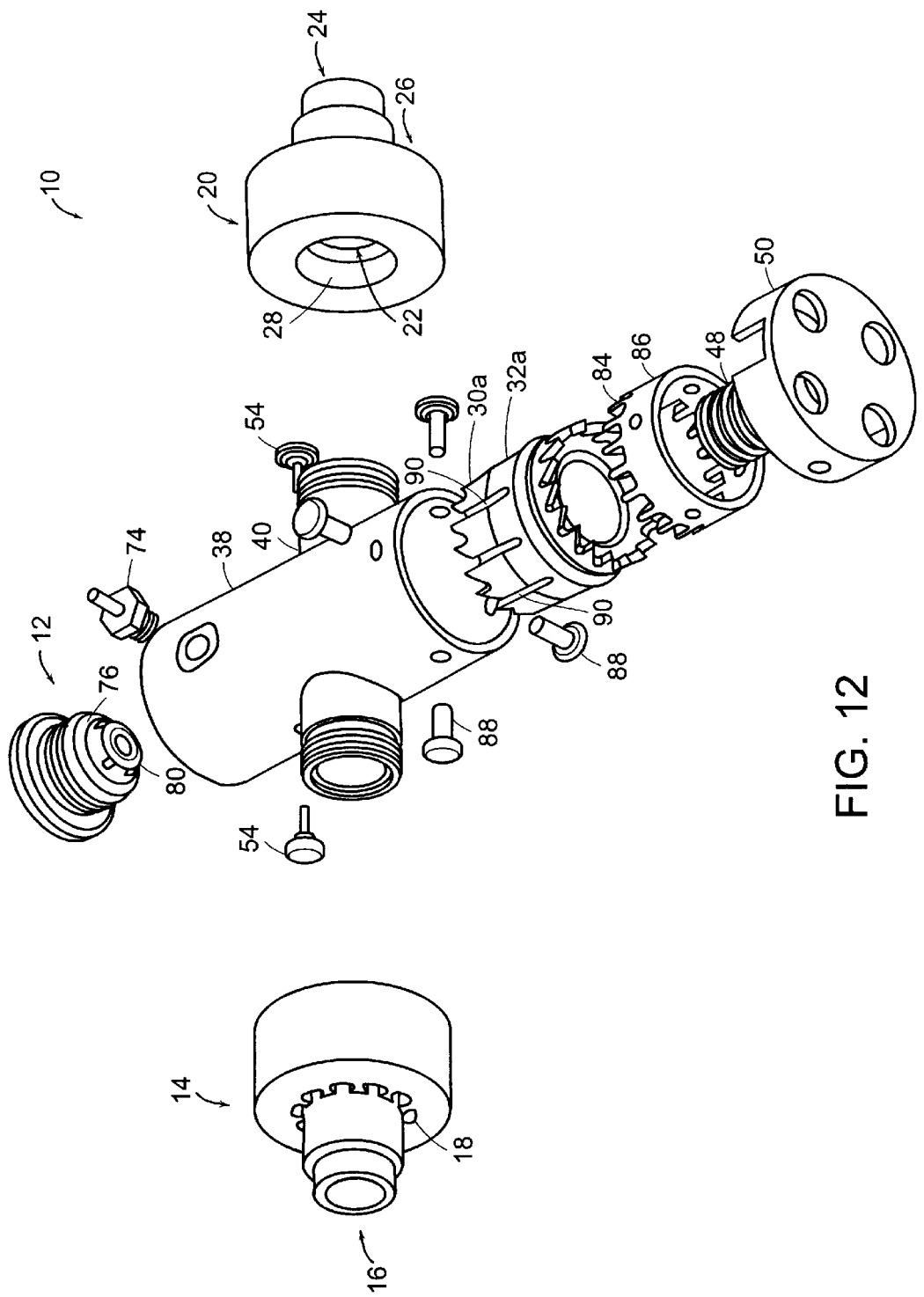
FIG. 12 is an exploded view of an alternative embodiment of the present invention.

We now turn to an alternative embodiment, of which FIG. 12 is an exploded view. With two exceptions, this embodiment is the same as the one that FIG. 1 depicts, and identical reference numerals identify identical parts. The first exception is that the controlled ports in FIG. 12 do not include FIG. 1's check valves 36 and 44 or actuating pins 34 and 42. The second exception is that the surface 30a of its index member 32a differs from FIG. 1's index-member surface 30.

Figure 13:
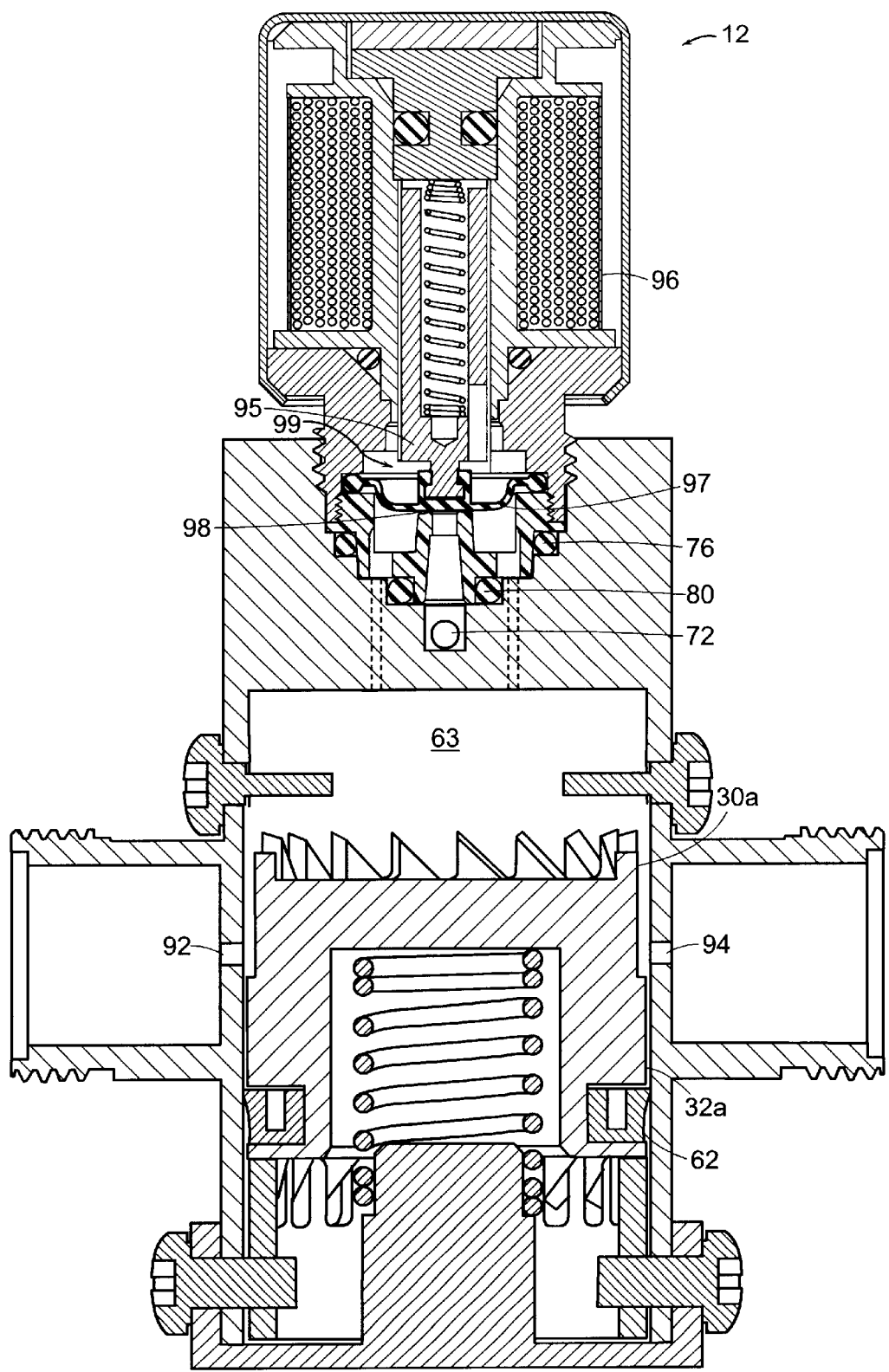
FIG. 13 is a front elevation, with parts broken away, of the same embodiment with its index member extended because the three-way valve's control valve is closed.

Specifically, surface 30a does not have the gradual undulations that characterize FIG. 1's surface 30. Instead, surface 30a is substantially cylindrical but forms discretely positioned grooves 90, whose purpose is selectively to permit flow through the various controlled ports. As FIG. 13 shows, the portion of index member 32a above its lip seal 62 is divided into two segments having different outer diameters. The lower segment's diameter is nearly equal to the manifold wall's inner diameter, and the upper segment's outer diameter is smaller and therefore leaves a significant clearance between it and the manifold wall.

In the extended reciprocation state, which FIG. 13 depicts, the port orifices 92 and 94 by which fluid flows through the controlled ports face the index member's upper, smaller-outer-diameter portion. Because of the clearance left by this portion between it and the manifold wall, the pressure to which the controlled ports provide communication prevails in the manifold chamber 63. Here again, check valves may be added to the ports to prevent cross talk.

Figure 14:
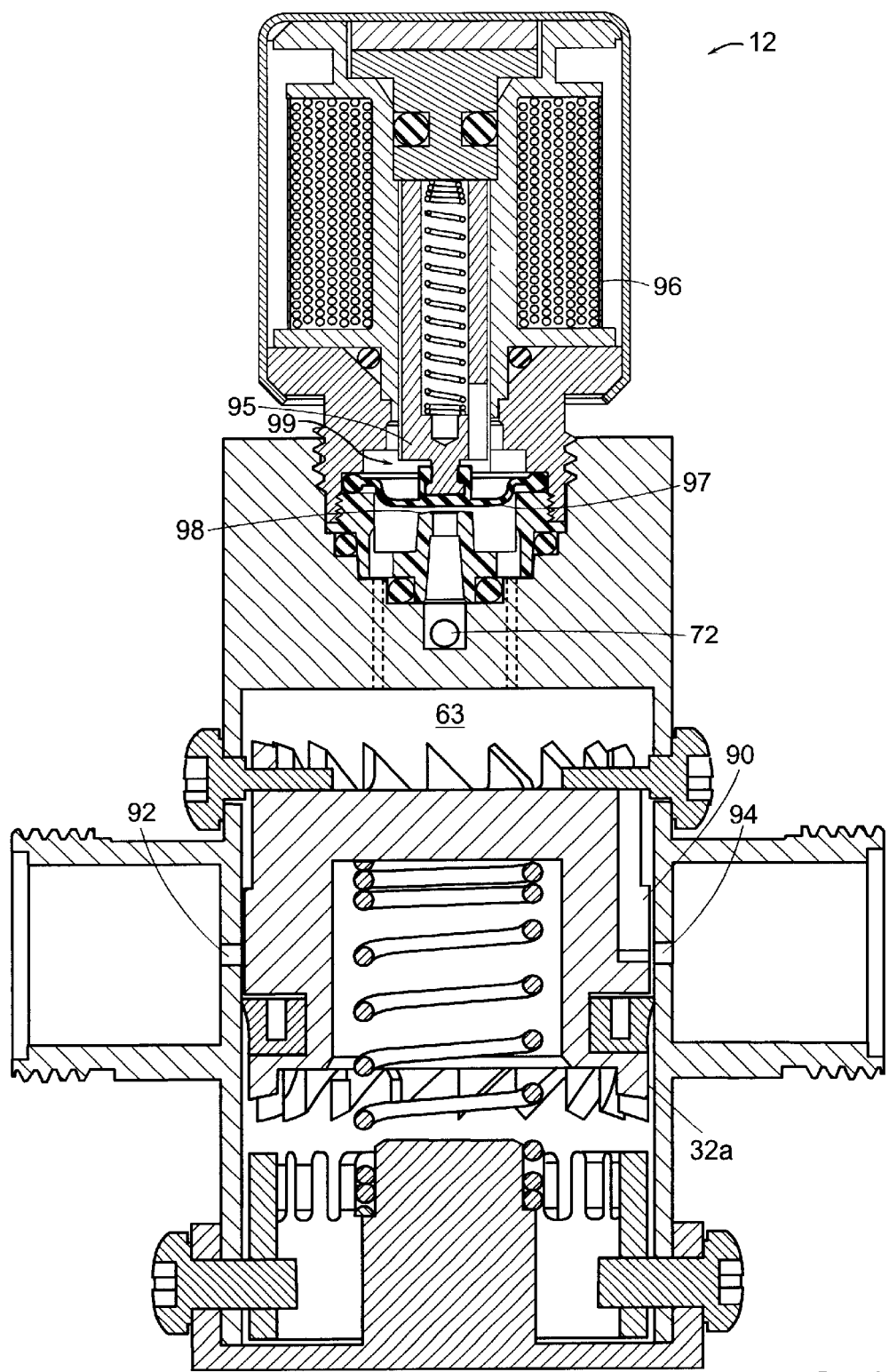
FIG. 14 is a similar view showing the index member retracted and rotated to an index position in which the three-way valve permits flow through the control valve from its right inlet only.

When valve 12 thereafter opens and thereby relieves the manifold pressure, the spring force again translates index member 32a upward. As before, the index member 32a is so cammed as to rotate. In this embodiment, that rotation brings one of FIG. 12's grooves 90 into registration with one of the port orifices. FIG. 14 depicts the index position in which it is the right port orifice 94 with which a groove registers. No groove is disposed in registration with the left port orifice 92, though, so the lower, larger-outer-diameter index-member portion closes the left port. When the three-way valve is in the state that FIG. 14 illustrates, it thus permits flow to its outlet from its right port but not from its left port.

Figure 15:
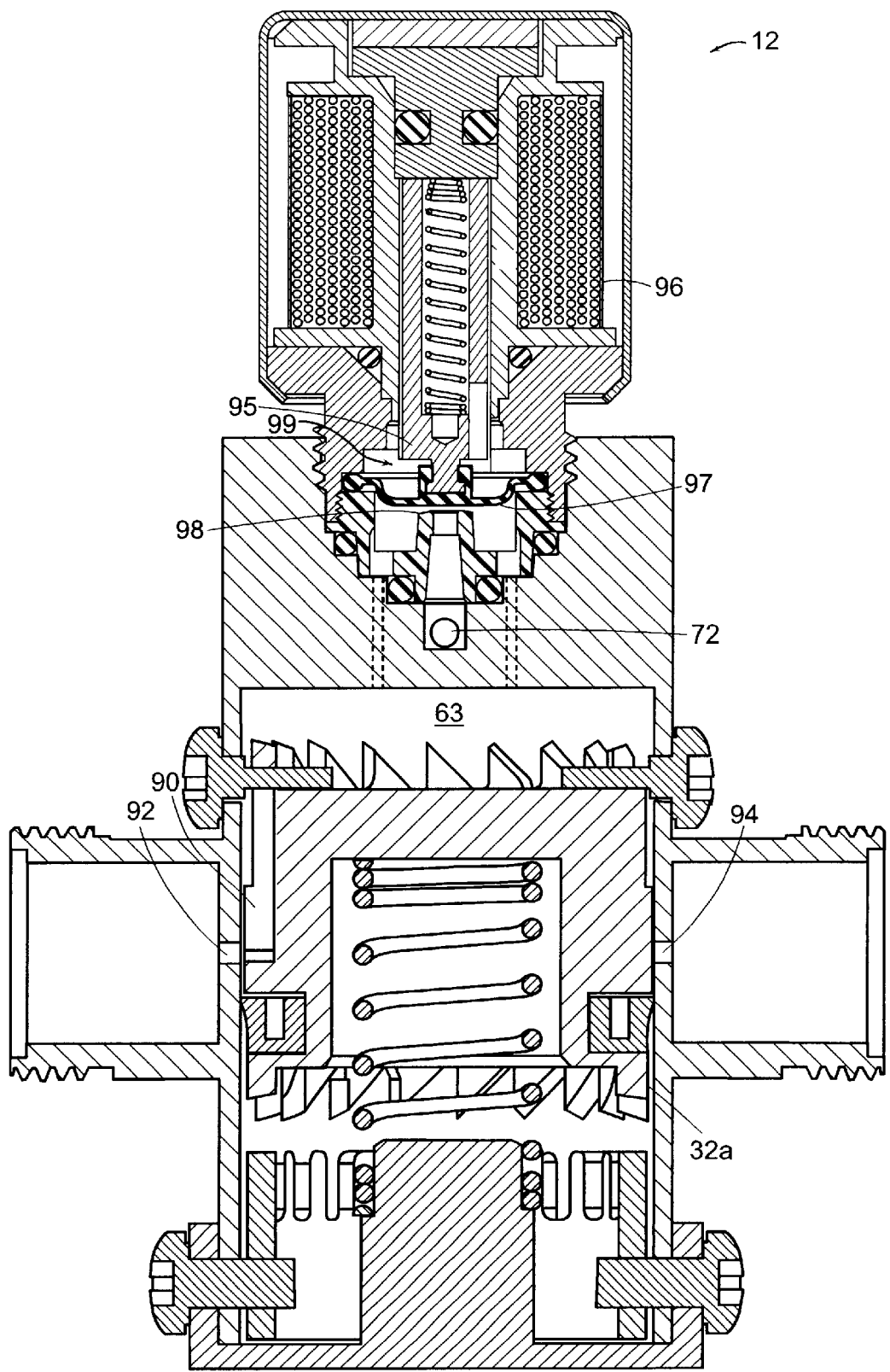
FIG. 15 is a similar view showing the index member retracted and rotated to an index position in which the three-way valve permits flow through the control valve from its left inlet only.

If valve 12 is again closed, the index member 32a advances from the rest reciprocation state that FIG. 14 depicts to an extended reciprocation state similar to the one that FIG. 13 represents. In assuming that state, the index member 32a is again cammed to rotate to a new index position, and it further rotates when it is returned to a rest reciprocation state as a result of a subsequent reopening of the control valve 12. FIG. 15 depicts that position, in which a groove 90 is disposed in registration with the left port orifice 92 but none is disposed in registration with the right port orifice 94. With the index member 32a in this position, fluid flows to the three-way valve's outlet 72 from its left port but not from its right port.

FIGS. 13, 14, and 15 show that the control valve can be a very low-power valve. The type of valve that those drawings illustrate is of the diaphragm type, in which a plunger 95 driven by a solenoid 96 either seats a diaphragm 97 onto a valve seat 98 or unseats it. Pressure from the manifold chamber is transferred through the diaphragm to an incompressible fluid disposed in the plunger's chamber 99, and that fluid's pressure tends to balance the force that the manifold pressure applies to the diaphragm 97. So the force the solenoid needs to apply to the plunger is little more than the amount required to deform the diaphragm and overcome the plunger's inertia. Moreover, the force needs to be applied only through the relatively short distance required to seat the diaphragm or unseat it adequately.

Because the three-way valve is being used as a pilot valve in the illustrated embodiment, the flow through the control valve itself can be small indeed. This means that the plunger travel and any pressure-imposed force can be small enough for the energy expended per actuation in driving the solenoid to be minuscule. But the expended energy can be quite low even in applications in which the flow through the control valve is large, because the control valve could then be provided as a pilot-operated valve, in which the solenoid drives the pilot section.

Figure 16:
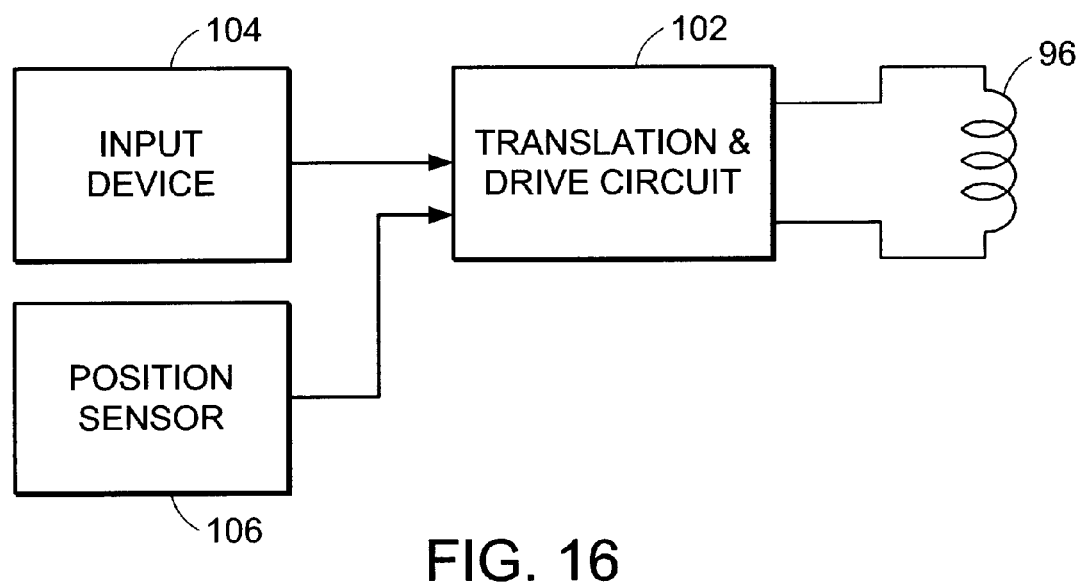
FIG. 16 is a block diagram depicting one type of control system that may be employed with embodiments of the present invention.

FIG. 16 is a block diagram of the type of control system that may be used in operating the illustrated three-way valve. A translation-and-drive circuit 102, which would typically be microprocessor-based, receives an input signal that either explicitly identifies one of the three flow states or otherwise presents information from which the desired flow state may be inferred. To indicate that circuit 102 receives such an input, FIG. 16 includes a block 104 that represents an appropriate signal source. That source may, for instance, be a push button or set thereof, it may be a sensor of temperature, user position, etc., it may be a combination of such devices, or it may be some other signal source.

Independently of how circuitry 102 determines what the desired flow state should be, it determines from the current state the control-valve actuations, if any, that need to be performed to reach the desired state. What those actuations need to be will depend on the particular embodiment.

Consider the actuation required in the illustrated embodiments, for example. If the desired flow state is the no-flow state but the three-way valve is not yet in that state, circuitry 102 does not need to take the index position into account; simply closing the control valve always places the illustrated embodiments into their no-flow states. To close the control valve, the control circuit drives current steadily through the control valve's solenoid 96 if the control valve is of the monostable variety and biased open. If the control valve is a monostable valve and biased closed, the control circuit stops its drive current. If the valve is of the latching variety, the control circuit can close it by driving current through the solenoid 96 only momentarily.

If the desired state in the illustrated embodiments is one of the two states in which flow is permitted, on the other hand, circuitry 102 will need to begin with a determination of the index member's current position. One way to determine position is to rely on a position sensor 106. Another way is to fetch position information from persistent memory whose contents are initialized during manufacture and subsequently updated on each flow-state change. Yet another way is to employ a hybrid of those techniques. For example, the sensor may include a reed switch mounted on the manifold. Each time the control system powers up or is otherwise initialized, it advances the index member to a location at which the reed switch detects the presence of a magnet disposed for that purpose on the index member. From then on, (possibly volatile) memory is used to keep track of index positions so long as the unit is powered up. Often, none if these techniques is necessary, because the valve's current flow state can be inferred from the sensor outputs from which the desired flow state was determined.

To reach one of the two flow-permitted states, the valve must first be operated to the no-flow state in the illustrated embodiments if the valve is currently in the other flow-permitted state. This is done by closing the control valve 12 as described above. If the current state is already the no-flow state, that step is no necessary. In both cases, the control valve is then operated to its open, pressure-relieving state. If the control valve is a latching valve, this will involve driving current through its solenoid only momentarily, typically in the direction opposite the one required to place it in its closed, pressure-maintenance state, although latching valves can be so constructed as to be toggled without thus reversing the current drive. For a monostable control valve, current has to be driven steadily through the control valve's solenoid if the control valve is biased closed and has to be discontinued if it is biased open.

Although we have described two exemplary embodiments of our invention, it should be apparent that its teachings can be implemented in a wide range of other embodiments. Although we have depicted both embodiments as pilot valves, for example, the invention is not restricted to such applications. Nor is there any reason in principle why a multi-flow-state system employing the present invention's teachings cannot be controlled by a user's opening and closing a control valve manually, although the present invention's advantages are most manifest when the control valve is electrically operated.

Moreover, other types of reciprocation steppers can be used to implement the present invention's teachings. Although the reciprocation stepper used in the illustrated embodiments is of the type in which the same part serves both as the index member and as the reciprocation member, for example, there is no reason why other embodiments of the present invention need to use that type. Nor is there any reason why the flow state cannot be determined by a plurality of separately movable index members instead of only one. And, although the illustrated embodiments'reciprocation members always assume the same axial position in the relaxed reciprocation state, this is not true of all types of reciprocation steppers that can be employed in implementing the invention.

As was stated above, moreover, the index member can be so designed as to extend the invention's teachings to any number of flow states, not just the illustrated embodiments' three. A different number of ports can be provided, for instance, and different index positions can be made to permit flow through respective different combinations of controlled ports. And, in flow states of some embodiments, flow may occur from one or more controlled ports to one or more others, not just between the control port and the controlled ports. For example, although each illustrated embodiment provides only one manifold chamber, with which all ports provide communication, some embodiments may provide additional chambers, ones with which the control port does not provide communication. Some of the controlled ports—i.e., some of the ports whose individual states the index member controls—will provide communication with those chambers instead of the control port's chamber so that simultaneous flows can be segregated.

Nor is it necessary that there be a plurality of controlled ports. The index member can be so designed that its different index positions result in different flow resistances for the same controlled port. Different index positions can align different-sized index-member orifices or grooves with the same controlled port, for example. Furthermore, although the control valve in the illustrated embodiments is used to allow or prevent relief of pressure communicated to the manifold chamber by the controlled ports, reflection reveals that the invention can be employed in systems in which fluid instead flows in the reverse direction, i.e., in through the control port.

Finally, although the bias toward the relaxed reciprocation state will typically be provided by some kind of spring, such as the illustrated coil spring, some other resilient component, such as a compressed gas, may be employed instead. Indeed, the necessary bias can be provided without any resilient member. For example, a source of pressurized fluid can be coupled to the side of the reciprocation member opposite the manifold chamber. It may be the same as the source of the manifold chamber pressure, for example, but prevail over an area smaller than that over which the reciprocation member is subjected to that pressure. So long as the manifold pressure is maintained, the force from the manifold chamber is greater than the force from the reciprocation member's other side and thereby keeps the reciprocation member in its extended reciprocation state. But the pressure on the other side urges the reciprocation member to its relaxed reciprocation state when the manifold-chamber pressure is relieved. So the controlled fluid's pressure can be used to move the reciprocation member in both directions without resorting to a multi-way control valve.

It is thus apparent that the present invention can be employed in a wide range of embodiments and thus constitutes a significant advance in the art.

What is claimed is:

1. A multi-way valve comprising:
   A) a reciprocation stepper that includes:
      i) a reciprocation member biased to a relaxed reciprocation state and reciprocable between the relaxed reciprocation state and an extended reciprocation state; and
      ii) an index member that can assume each of a sequence of at least three index positions through which reciprocation of the reciprocation member advances it;
   B) a two-way control valve operable between open and closed states thereof; and
   C) a manifold defining a manifold chamber to whose pressure the reciprocation member is so exposed as to tend to be urged thereby toward its extended reciprocation state, the manifold providing a plurality of ports, including a control port through which the control valve controls flow and at least one controlled port whose flow state the index position of the index member determines, that afford fluid communication with the manifold chamber and together assume, from a sequence of at least three different flow states, a flow state determined by the control valve's state and the index member's index position, whereby, when at least one port is so coupled to at least one source of pressurized fluid that the manifold-chamber pressure is great enough when the control valve is in one said open or closed state thereof, called its pressure-maintenance state, to hold the reciprocation member in its extended reciprocation state but is low enough when the control valve is in its other state, called its pressure-relief state, to permit the reciprocation member to assume its relaxed reciprocation state, the ports can be stepped through the sequence of at least three flow states by operating the control valve between its pressure-maintenance and pressure-relief states.

2. A multi-way valve as defined in claim 1 wherein the index member is the reciprocation member.

3. A multi-way valve as defined in claim 2 wherein:
   A) the index member forms a relaxation-state cam-follower surface and extended-state cam-follower surface;
   B) the reciprocation stepper includes a relaxation-state cam member so shaped and positioned as to engage the relaxation-state cam-follower surface and thereby cam the index member to the next index position in the sequence thereof as the reciprocation member assumes its relaxation reciprocation state; and
   C) the reciprocation stepper includes an extended-state cam member so shaped and positioned as to engage the relaxation-state cam-follower surface and thereby cam the index member to the next index position in the sequence thereof as the reciprocation member assumes it extended reciprocation state.

4. A multi-way valve as defined in claim 3 wherein:
   A) each controlled port includes:
      i) a port passage extending between the exterior and the interior of the manifold; and
      ii) a port valve operable between an open state, in which it permits fluid flow through the port passage, and a closed state, in which it prevents such flow; and
   B) the index member forms an index-member surface so shaped as to operate each port valve selectively in accordance with the index member's index position.

5. A multi-way valve as defined in claim 4 wherein:
   A) each port valve is a check valve so oriented as to tend to seat in response to flow through the port passage into the interior of the manifold and thus prevent such flow; and
   B) the index-member surface is so shaped as to unseat each check valve selectively in accordance with the index member's index position.

6. A multi-way valve as defined in claim 3 wherein:
   A) each controlled port includes a port passage formed by the manifold between the exterior and the interior thereof; and
   B) the index member forms an index-member surface so shaped as to obstruct each port passage selectively in accordance with the index member's index position.

7. A multi-way valve as defined in claim 3 wherein the control valve is an electrically operated valve.

8. A multi-way valve as defined in claim 7 wherein the control valve is a latching valve.

9. A multi-way valve as defined in claim 3 further including a bias spring that biases the reciprocation member to the relaxed reciprocation state.

10. A multi-way valve as defined in claim 3 wherein the number of controlled ports is two.

11. A multi-way valve as defined in claim 10 wherein the sequence of flow states consists of first, second, and third flow states that, when the control valve alternates between its pressure-maintenance and pressure-relief states, repeatedly follow each other in the following order: first, second, first, third.

12. A multi-way valve as defined in claim 11 wherein the multi-way valve prevents flow when it is in the first flow state, permits flow only between a first of the controlled ports and the control port when it is in the second flow state, and permits flow only between a second of the controlled ports and the control port when it is in the third flow state.

13. A multi-way valve as defined in claim 2 wherein:
A) each controlled port includes:
  i) a port passage extending between the exterior and the interior of the manifold; and
  ii) a port valve operable between an open state, in which it permits fluid flow through the port passage, and a closed state, in which it prevents such flow; and
B) the index member forms an index-member surface so shaped as to operate each port valve selectively in accordance with the index member's index position.

14. A multi-way valve as defined in claim 13 wherein:
A) each port valve is a check valve so oriented as to tend to seat in response to flow through the port passage into the interior of the manifold and thereby prevent such flow; and
B) the index-member surface is so shaped as to unseat each check valve selectively in accordance with the index member's index position.

15. A multi-way valve as defined in claim 2 wherein:
A) each controlled port includes a port passage formed by the manifold between the exterior and the interior thereof; and
B) the index member forms an index-member surface so shaped as to obstruct each port passage selectively in accordance with the index member's index position.

16. A multi-way valve as defined in claim 2 further including a bias spring that biases the reciprocation member to the relaxed reciprocation state.

17. A multi-way valve as defined in claim 2 wherein the control valve is an electrically operated valve.

18. A multi-way valve as defined in claim 17 wherein the control valve is a latching valve.

19. A multi-way valve as defined in claim 1 further including a bias spring that biases the reciprocation member to the relaxed reciprocation state.

20. A multi-way valve as defined in claim 1 wherein the control valve is an electrically operated valve.

21. A multi-way valve as defined in claim 20 wherein the control valve is a latching valve.

22. A multi-way valve as defined in claim 1 wherein the number of controlled ports is two.

23. A multi-way valve as defined in claim 22 wherein the sequence of flow states consists of first, second, and third flow states that, when the control valve alternates between its pressure-maintenance and pressure-relief states, repeatedly follow each other in the following order: first, second, first, third.

24. A multi-way valve as defined in claim 23 wherein the multi-way valve prevents flow when it is in the first flow state, permits flow only between a first of the controlled ports and the control port when it is in the second flow state, and permits flow only between a second of the controlled ports and the control port when it is in the third flow state.

25. A method of flow control comprising:
A) providing a multi-way valve that includes:
  i) a reciprocation stepper that includes:
    a) a reciprocation member biased to a relaxed reciprocation state and reciprocable between the relaxed reciprocation state and an extended reciprocation state; and
    b) an index member that can assume each of a sequence of index positions through which reciprocation of the reciprocation member advances it;
  ii) a control valve operable between open and closed states thereof, and
  iii) a manifold defining a manifold chamber to whose pressure the reciprocation member is so exposed as to tend to be urged thereby toward its extended reciprocation state, the manifold providing a plurality of ports, including a control port through which the control valve controls flow and at least one controlled port whose flow state the index position of the index member determines, that afford fluid communication with the manifold chamber and together assume, from a sequence of at least three different flow states, a flow state determined by the control valve's state and the index member's index position;
B) so coupling at least one port to at least one source of pressurized fluid that the manifold-chamber pressure is great enough when the control valve is in one said open or closed state thereof, called its pressure-maintenance state, to hold the reciprocation member in its extended reciprocation state but is low enough when the control valve is in its other state, called its pressure-relief state, to permit the reciprocation member to assume its relaxed reciprocation state; and
C) operating the control valve between its pressure-maintenance and pressure-relief states and thereby stepping the ports through the sequence of at least three flow states.

26. A method of flow control as defined in claim 25 wherein:
A) the coupling of at least one port to at least one source of pressurized fluid includes coupling each of the controlled ports to a source of pressurized fluid; and
B) the method includes coupling the control port to relatively low pressure.

27. A method of flow control as defined in claim 26 wherein the control valve is an electrical valve.

28. A method of flow control as defined in claim 25 wherein:
A) the control valve includes a solenoid by which it is actuated; and
B) the operating of the control valve includes changing its state by driving current through its solenoid momentarily.

29. A method of flow control as defined in claim 28 wherein:
A) the operating of the control valve to its pressure-maintenance state includes driving current through its solenoid momentarily in one direction; and
B) the operating of the control valve to its pressure-relief state includes driving current through its solenoid momentarily in the other direction.

30. A method of flow control as defined in claim 26 wherein the number of controlled ports is two.

31. A method of flow control as defined in claim 30 wherein the sequence of flow states consists of first, second, and third flow states that, when the control valve alternates between its pressure-maintenance and pressure-relief states, repeatedly follow each other in the following order: first, second, first, third.

32. A method of flow control as defined in claim 31 wherein the three multi-way valve prevents flow when it is in the first flow state, permits flow only between a first of the controlled ports and the control port when it is in the second flow state, and permits flow only between a second of the controlled ports and the control port when it is in the third flow state.

33. A method of flow control as defined in claim 25 wherein the control valve is an electrical valve.

34. A method of flow control as defined in claim 33 wherein:
- A) the control valve includes a solenoid by which it is actuated; and
- B) the operating of the control valve includes changing its state by driving current through its solenoid momentarily.

35. A method of flow control as defined in claim 34 wherein:
- A) the operating of the control valve to its pressure-maintenance state includes driving current through its solenoid momentarily in one direction; and
- B) the operating of the control valve to its pressure-relief state includes driving current through its solenoid momentarily in the other direction.

36. A method of flow control as defined in claim 25 wherein the number of controlled ports is two.

37. A method of flow control as defined in claim 36 wherein the sequence of flow states consists of first, second, and third flow states that, when the control valve alternates between its pressure-maintenance and pressure-relief states, repeatedly follow each other in the following order: first, second, first, third.

38. A method of flow control as defined in claim 37 wherein the multi-way valve prevents flow when it is in the first flow state, permits flow only between a first of the controlled ports and the control port when it is in the second flow state, and permits flow only between a second of the controlled ports and the control port when it is in the third flow state.

* * * * *